United States Patent
Chien

(10) Patent No.: US 10,890,790 B2
(45) Date of Patent: Jan. 12, 2021

(54) REPAIRING METHOD FOR ABNORMAL PIXEL SPOTS OF DISPLAY PANEL AND DISPLAY DEVICE

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 16/349,619

(22) PCT Filed: May 26, 2017

(86) PCT No.: PCT/CN2017/086145
§ 371 (c)(1),
(2) Date: May 14, 2019

(87) PCT Pub. No.: WO2018/205316
PCT Pub. Date: Nov. 15, 2018

(65) Prior Publication Data
US 2019/0377206 A1  Dec. 12, 2019

(30) Foreign Application Priority Data

May 9, 2017 (CN) .......................... 2017 1 0321257

(51) Int. Cl.
G02F 1/13 (2006.01)
G02F 1/1335 (2006.01)
(Continued)

(52) U.S. Cl.
CPC .......... G02F 1/1309 (2013.01); G02F 1/1368 (2013.01); G02F 1/133528 (2013.01); G02F 1/136259 (2013.01)

(58) Field of Classification Search
CPC ......... G02F 1/133528; G02F 2201/508; G02F 1/136259; G02F 1/1309
See application file for complete search history.

(56) References Cited

U.S. PATENT DOCUMENTS

2010/0253877 A1* 10/2010 Lee ........................ G02F 1/1309
349/62
2011/0069260 A1* 3/2011 Yang ..................... G02F 1/1309
349/110
(Continued)

FOREIGN PATENT DOCUMENTS

CN 1580891 A 2/2005
CN 101672993 A 3/2010
(Continued)

OTHER PUBLICATIONS

Miao Zhang, the Isa written comments. Feb. 2018, CN.
Miao Zhang, the International Search Report, dated Feb. 2018, CN.

*Primary Examiner* — Michael H Caley
*Assistant Examiner* — Mariam Qureshi

(57) ABSTRACT

The present application discloses a repairing method for abnormal pixel spots of a display panel and display apparatus, including steps: installing a polarizing plate between a display panel and a screen of a display apparatus, finding and marking abnormal pixel spots on the polarizing plate, and changing optical polarization structures at the abnormal pixel spots by using specific light rays.

14 Claims, 2 Drawing Sheets

(51) Int. Cl.
  *G02F 1/1362* (2006.01)
  *G02F 1/1368* (2006.01)

(56) References Cited

U.S. PATENT DOCUMENTS

2014/0256205 A1* 9/2014 Cordingley ............ G01N 21/95
                                                              445/2
2018/0356679 A1* 12/2018 Iida ......................... G02B 5/30

FOREIGN PATENT DOCUMENTS

| | | |
|---|---|---|
| CN | 102116948 A | 7/2011 |
| CN | 102749740 A | 10/2012 |
| CN | 105008991 A | 10/2015 |
| KR | 101232136 B1 | 2/2013 |

* cited by examiner

REPAIRING METHOD FOR ABNORMAL PIXEL SPOTS OF DISPLAY PANEL AND DISPLAY DEVICE

This application claims priority to Chinese Patent Application No. CN2017103212570, filed with the Chinese Patent Office on May 9, 2017 and entitled "REPAIRING METHOD FOR ABNORMAL PIXEL SPOTS OF DISPLAY PANEL AND DISPLAY DEVICE", which is incorporated herein by reference in its entirety.

TECHNICAL FIELD

The present application relates to the technical field of display panels, and more particularly to a repairing method for abnormal pixel spots of a display panel and display device The descriptions herein provide only background information related to the present application, and do not necessarily constitute the prior art.

BACKGROUND

With the development and progress of science and technology, liquid crystal display apparatuses become a main product of display apparatuses due to such advantages as a thin body, power savings, low radiation, etc. and are widely used. Most liquid crystal display apparatuses are backlit type liquid crystal display apparatuses, each including a liquid crystal panel and a backlight module. Working principle of the liquid crystal panel is that liquid crystals are put in two parallel glass substrates, and a driving voltage is applied to the two glass substrates to control rotation of the liquid crystals, to refract light rays of the backlight module to generate a picture.

Thin film transistor-liquid crystal display apparatuses (TFT-LCD) maintain a leading status in the display field because of low power consumption, excellent picture quality, high production yield, and other properties. Similarly, the TFT-LCD includes a liquid crystal panel and a backlight module. The liquid crystal panel includes a color filter substrate (CF substrate), a thin film transistor substrate (TFT substrate) and a mask, and transparent electrodes on respective inner sides of the above substrates. A layer of liquid crystals (LC) is positioned between two substrates.

Either backward or advanced display apparatuses may inevitably have an abnormal pixel spots, and particularly may have an abnormal pixel bright spots. The pixel spots in a "normally bright" state greatly affect the display of the display apparatuses.

It should be noted that the above introduction of the technical background is described only to facilitate clear and complete description of the technical solutions of the present application, and facilitate the understanding for those of ordinary skill in the art. The above-mentioned technical solutions shall not be considered as well-known solutions by those of ordinary skill in the art just because these solutions are described in the background of the present application.

SUMMARY

The present application provides an abnormal pixel spots repairing method for a display panel that improves abnormal pixel spots.

To achieve the above purpose, the present application provides a repairing method for abnormal pixel spots, including:

installing a polarizing plate between a display panel and a screen of a display apparatus;

finding and marking abnormal pixel spots on the polarizing plate; and changing optical polarization structures at the abnormal pixel spots by using specific light rays.

In the present application, since work of repairing the abnormal pixel spots is conducted at the polarizing plate and not at a thin film transistor or a filter, not only a purpose of repairing the abnormal pixel spots is achieved, but also unrepairable damage is not caused to the thin film transistor and the filter. Specifically, when the abnormal pixel bright spots appear, the polarizing plate can be irradiated through specific light rays according to a solution of the present application, so as to locally change optical polarization structures at the abnormal pixel bright spots by reducing the luminous flux, or blocking light rays from passing, or increasing the luminous flux in some cases, or guiding the light rays around the abnormal pixel bright spots to the abnormal pixel spots, thereby achieving a repair purpose. Moreover, because an irreversible damage is caused relative to the thin film transistor or the filter, the polarizing plate is promising to be repaired to original optical polarization structures through light rays of other parameters. Even if the damage is unrepairable, replacement of the polarizing plate is much easy and cheap.

Specific embodiments of the present application are disclosed in detail with reference to subsequent explanation and drawings, and manners in which principles of the present application may be adopted are indicated. It should be understood that a scope of the embodiments of the present application is not limited thereto. Within the scope of spirits and clauses of appended claims, embodiments of the present application include many alterations, modifications and equivalents.

Features described and/or shown for one embodiment may be used in one or more other embodiments in the same or similar manner, combined with features in other embodiments, or replace the features in other embodiments.

It should be emphasized that the terms "comprise and/or include" used herein specify the existence of features, integers, steps or assemblies, not excluding the existence or addition of one or more other features, integers, steps or assemblies.

DESCRIPTION OF THE DRAWINGS

The drawings included are used for providing further understanding of embodiments of the present application, constitute portion of the description, are used to illustrate implementation manners of the present application, and interpreted principles of the present application together with text description. Apparently, the drawings in the following description are merely some embodiments of the present application, and for those of ordinary skill in the art, other drawings can also be obtained according to the drawings without contributing creative labor.

DETAILED DESCRIPTION

To make those of ordinary skill in the art better understand technical solutions in the present application, the technical solutions in embodiments of the present invention will be clearly and fully described below in combination with the drawings in the embodiments of the present invention. Apparently, the described embodiments are merely part of the embodiments of the present invention, not all of the embodiments. Based on the embodiments in the present application, all other embodiments obtained by those of ordinary skill in the art without contributing creative labor will belong to the protection scope of the present application.

At present, display apparatuses become more varied and get more and more advanced.

Either backward or advanced display apparatuses may inevitably have a abnormal pixel spots, and particularly may have a abnormal pixel bright spots. The pixel spots in a "normally bright" state greatly affect the display of the display apparatuses.

Figure 1:
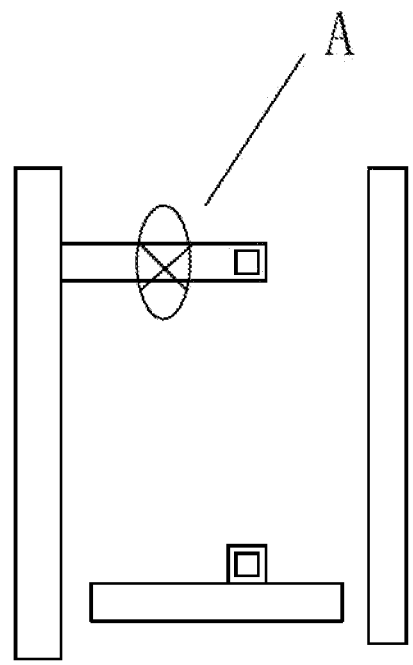
FIG. 1 is a schematic diagram of a principle for solving abnormal pixel spots by turning off an active switch.
Figure 2:
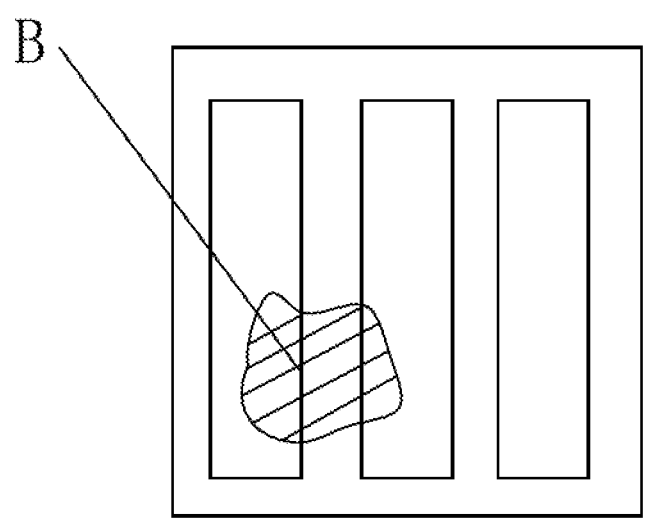
FIG. 2 is a schematic diagram of a principle for solving abnormal pixel spots by laser blackening.

FIG. 1 and FIG. 2 show schematic diagrams of some undisclosed methods for repairing abnormal pixel bright spots used by inventors of the present application. With reference to FIG. 1 and FIG. 2, some undisclosed methods for repairing abnormal pixel bright spots are used by inventors. For example, laser is used to cut off a line of a thin film transistor (TFT) at abnormal pixel brightness. As shown in the figure, a line cut-out point A cuts off the line of the TFT in a truncation manner to enable the TFT not to be illuminated, thereby improving the abnormal pixel bright spots. Or, laser is used to blacken a filter at the abnormal pixel bright spots. As shown in the figure, a filter blackening position B realizes blackening through the laser to enable the light rays not to pass, thereby achieving a purpose of improving the abnormal pixel bright spots.

Figure 3:
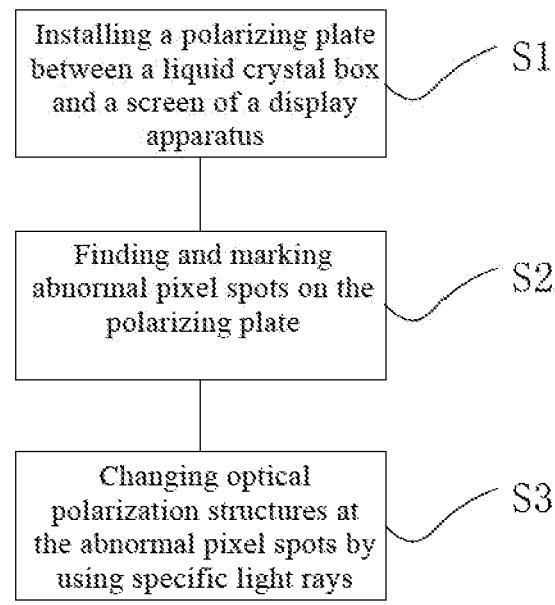
FIG. 3 is a flow chart of a repairing method for abnormal pixel spots in the present application.
Figure 4:
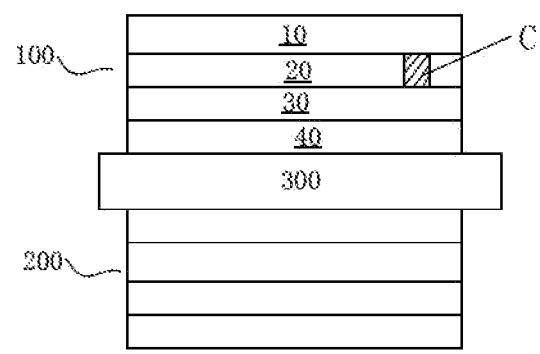
FIG. 4 is a brief view of a display panel structure in the present application.

However, above methods have respective defects. Thus, a following solution is obtained through improvements by inventors of the present application:

FIG. 3 is a flow chart of a repairing method for abnormal pixel spots in the present application. FIG. 4 is a brief view of a display panel structure in the present application. With reference to FIG. 1, FIG. 2 and FIG. 3, the present application discloses a repairing method for abnormal pixel spots, including steps:

S1: installing a polarizing plate between a display panel and a screen of a display apparatus, S2: finding and marking abnormal pixel spots on the polarizing plate, and S3: changing optical polarization structures at the abnormal pixel spots by using specific light rays.

In the present application, since work of repairing the abnormal pixel spots is conducted at the polarizing plate and not at a thin film transistor or a filter, not only a purpose of repairing the abnormal pixel spots is achieved, but also an unrepairable damage is not caused to the thin film transistor and the filter. Specifically, when the abnormal pixel bright spots appear, the polarizing plate can be irradiated through specific light rays according to a solution of the present application, so as to locally change optical polarization structures at the abnormal pixel bright spots by reducing the luminous flux, or blocking light rays from passing, or increasing the luminous flux in some cases, or guiding the light rays around the abnormal pixel bright spots to the abnormal pixel spots, thereby achieving a repair purpose. Moreover, because an irreversible damage is caused relative to the thin film transistor or the filter, the polarizing plate is promising to be repaired to original optical polarization structures through light rays of other parameters. Even if the damage is unrepairable, replacement of the polarizing plate is much easy and cheap.

LCD CELL is a portion of an LCD module except for the backlight module and includes such components as a TFT, a polarizer, a color filter layer, a spacer, a common sheet (transparent indium tin oxide), liquid crystals and the like, LCD CELL can be understood as an LCD optical film, or an LCD optical unit, and in other words, can be understood to include such components as a liquid crystal box, a TFT and a filter.

In one or more embodiments, optionally, the polarizing plate successively includes a first film layer 10 (TAC layer), a polarizing layer 20 (PVA layer), a second film layer 30 (TAC layer) and a pressure sensitive adhesive layer 40 (PSA layer) from outside to inside.

A step of changing optical polarization structures at the abnormal pixel spots by using specific light rays includes: processing the polarizing layer by using the specific light rays and changing optical polarization structures at the abnormal pixel spots to form the shading portion. For example, in the figure, an abnormal pixel spot C is a to-be-repaired place in one or more embodiments, the optical polarization structure at the abnormal pixel spot is changed to reduce the luminous flux, so that a possibility that an abnormal condition at this place is known by others is reduced. Moreover, a light ray situation at this place is covered by surrounding light rays, thereby reducing an influence of the abnormal pixel spot on the display of the display apparatus. Specifically, when the abnormal pixel spot is an abnormal pixel bright spot, the optical polarization structure for reducing the luminous flux is changed, thereby reducing an influence of the bright spot on the display and to a certain extent achieving an effect of repairing the bright spot into a dark spot.

The present application also provides a method for repairing abnormal pixel spots, inchiding:

installing a polarizing plate on a display panel;

finding and marking abnormal pixel spots on the polarizing plate; and irradiating the abnormal pixel spots by using specific light rays to form a shading portion to reduce a luminous flux;

the polarizing plate successively including a first film layer, a polarizing layer, a second film layer and a pressure sensitive adhesive layer from outside to inside;

the display panel including a first substrate and a second substrate, installing an active switch on the first substrate, and a step of finding and marking the abnormal pixel spots on the polarizing plate including:

finding and marking first reference abnormal pixel bright spots on the first substrate;

finding and marking second reference abnormal pixel bright spots on a filter position; and finding and marking abnormal pixel bright spots corresponding to the polarizing plate through the first reference abnomial pixel bright spots and the second reference abnormal pixel bright spots;

a step of irradiating the abnormal pixel spots by using specific light rays to form a shading portion to reduce a luminous flux including:

processing the polarizing layer by using the specific light rays, and changing optical polarization structures at the abnormal pixel spots corresponding to the polarizing plate to form the shading portion; the polarizing plate including a first polarizing plate disposed on a light-emitting surface of the display panel and a second polarizing plate disposed on a light- entry surface of the display panel;

a step of processing the polarizing layer by using the specific light rays and changing optical polarization structures at the abnormal pixel spots to fomi the shading portion including:

processing the polarizing layer of the first polarizing plate by using the specific light rays and changing the optical polarization structures at the abnormal pixel spots to form the shading portion; and the specific light rays including low-wavelength infrared rays or picosecond laser or iodide special wavelength light.

The present application also provides a display apparatus, including a display panel, a screen of a display apparatus and a polarizing plate, the polarizing plate is disposed between the display panel and the screen of a display apparatus; where the polarizing plate is formed with a light shielding portion that reduces luminous flux.

The shading portion can perform an effect of reducing the luminous flux or blocking the light rays to pass, and the like according to different needs.

In the present embodiment, optionally, the polarizing plate includes a first polarizing plate 100 disposed on a light-emitting surface of the display panel 300 and a second polarizing plate 200 disposed on a light-entry surface of the display panel 300.

A step of processing the polarizing layer by using the specific light rays and changing optical polarization structures at the abnormal pixel spots to form the shading portion including: processing the polarizing layer of the first polarizing plate by using the specific light rays and changing the optical polarization structures at the abnormal pixel spots to form the shading portion. For example, in the figure, an abnormal pixel spot C is a to-be-repaired place. In the present embodiment, the polarizing plate is positioned between the display panel and an audience (the thin film transistor, the filter and the like can also be positioned between the polarizing plate and the display panel). Thus, at the light-entry surface for changing the optical polarization structure of the polarizing plate, the light ray situation of the abnormal pixel spot caused by abnormality at the display panel, the thin film transistor, the filter and the like is alleviated by the polarizing plate, thereby reducing an influence of the abnormal pixel spot on the display of the display apparatus. Specifically, when the abnormal pixel spot is an abnormal pixel bright spot the optical polarization structure for reducing the luminous flux is changed, thereby reducing an influence of the bright spot on the display and to a certain extent achieving an effect of repairing the bright spot into a dark spot.

In one or more embodiments, optionally, a step of finding and marking the abnormal pixel spots on the polarizing plate includes:

finding and marking abnormal pixel bright spots, and a step of changing optical polarization structures at the abnormal pixel spots by using the specific light rays includes:

changing optical polarization structures at the abnormal pixel spots by using the specific light rays to form a shading portion. In one or more embodiments, because a manner for locally changing the optical polarization structure of the polarizing plate used in the present application has a better effect of repairing the abnormal pixel bright spot, the manner can be mainly used in the work for repairing the abnormal pixel bright spot. Specifically, a position of the abnormal pixel bright spot is found and marked firstly. Then, the optical polarization structure at the abnormal pixel bright spot is changed through specific light rays to reduce and even block the light rays to pass, so as to achieve the effect of repairing the abnormal pixel bright spot into the dark spot, thereby improving the abnormal pixel bright spot. The shading portion can perform an effect of reducing the luminous flux or blocking the light rays to pass, and the like according to different needs.

In one or more embodiments, optionally, the specific light rays include low-wavelength infrared rays.

In one or more embodiments, optionally, the specific light rays include low-wavelength infrared rays or picosecond laser.

In one or more embodiments, optionally, the specific light rays include iodide special wavelength light.

When the local optical polarization structure of the polarizing plate is locally changed specifically, one light ray can be used alone, or many light rays can be used together.

In one or more embodiments, optionally, the display panel includes a first substrate and a second substrate. An active switch is installed on the first substrate. A step of finding and marking the abnormal pixel spots on the polarizing plate includes:

finding and marking first reference abnormal pixel bright spots on the first substrate, and finding and marking abnormal pixel bright spots corresponding to the polarizing plate through the reference abnormal pixel bright spots. In one or more embodiments, the abnormal pixel spot mainly refers to an abnormal pixel bright spot. However, the abnormal pixel bright spot has a close relationship with the thin film transistor. The position of the abnormal pixel bright spot can be accurately found and marked at the polarizing plate by finding and marking a first reference abnormal pixel bright spot at the thin film transistor. Moreover, because the abnormal pixel bright spot can be improved by changing the local optical polarization structure of the polarizing plate, an irreversible damage to the thin film transistor can also be avoided and future repair can be facilitated.

In one or more embodiments, optionally, a step of finding and marking the abnormal pixel spots on the polarizing plate further includes:

finding and marking second reference abnormal pixel bright spots on a filter position, and finding and marking abnormal pixel bright spots corresponding to the polarizing plate through the first reference abnormal pixel bright spots and the second reference abnormal pixel bright spots. In one or more embodiments, the abnormal pixel spot mainly refers to an abnormal pixel bright spot. However, the abnormal pixel bright spot has a close relationship with the thin film transistor and the filter. The position of the abnormal pixel bright spot can be accurately found and marked at the polarizing plate by finding and marking a first reference abnormal pixel bright spot and a second reference abnormal pixel bright spot at the thin film transistor and the filter. Moreover because the abnormal pixel bright spot can be improved by changing the local optical polarization structure of the polarizing plate, an irreversible damage to the thin film transistor can also be avoided and future repair can be facilitated.

In one or more embodiments, optionally, a step of finding and marking the abnormal pixel spots on the polarizing plate includes:

finding and marking abnormal pixel bright spots on the polarizing plate, finding and marking first reference abnormal pixel bright spots on the first substrate, finding and marking second reference abnormal pixel bright spots on a filter position, verifying whether the abnormal pixel bright spots are correct through the first reference abnormal pixel bright spots and the second reference abnormal pixel bright spots, and entering a next step if correct, otherwise, finding and marking abnormal pixel bright spots again. In one or more embodiments, the reference abnormal pixel bright spot is found and marked at the thin film transistor and the filter on the first substrate to assist in verifying whether the abnormal pixel bright spot is correctly and accurately found to avoid that the abnormal pixel bright spot is wrongly found or a scope is inaccurate and appears after repair and the optical polarization structure of the polarizing plate corresponding to the pixel having normal is changed.

Specific optional embodiments of the present application are described above in detail. It will be understood that those of ordinary skill in the art can make various modifications and alterations in accordance with the concepts of the present application without contributing creative labor. Therefore, all technical solutions obtained by those of ordinary skill in the art through logic analysis, reasoning or limited experiments in accordance with the concepts of the present application on the basis of the prior art should be within the protection scope determined by the claims.

What is claimed is:

1. A repairing method for abnormal pixel spots of a display panel, comprising the following steps:

installing a polarizing plate on a display panel;

finding and marking abnormal pixel spots on the polarizing plate;

irradiating the abnomial pixel spots by using specific light rays to form a shading portion to reduce a luminous flux;

the polarizing plate successively comprising a first film layer, a polarizing layer, a second film layer and a pressure sensitive adhesive layer from outside to inside;

the display panel comprising a first substrate and a second substrate, installing an active switch on the first substrate, and a step of finding and marking the abnormal pixel spots on the polarizing plate comprising:

finding and marking first reference abnormal pixel bright spots on the first substrate:

finding and marking second reference abnormal pixel bright spots on a filter position;

finding and marking abnormal pixel bright spots corresponding to the polarizing plate through the first reference abnormal pixel bright spots and the second reference abnormal pixel bright spots;

a step of irradiating the abnormal pixel spots by using specific light rays to form a shading portion to reduce a luminous flux comprising: processing the polarizing layer by using the specific light rays, and changing optical polarization structures at the abnormal pixel spots corresponding to the polarizing plate to form the shading portion;

the polarizing plate, comprising a first polarizing plate disposed on a light-emitting surface of the display panel and a second polarizing plate disposed on a light-entry surface of the display panel;

a step of processing the polarizing layer by using the specific light rays and changing optical polarization structures at the abnormal pixel spots to form the shading portion comprising: processing the polarizing layer of the first polarizing plate by using the specific light rays and changing the optical polarization structures at the abnormal pixel spots to form the shading portion; and the specific light rays comprising low-wavelength infrared rays or picosecond laser or ultraviolet light, wherein luminous flux of repaired optical polarization structures at the abnormal pixel bright spots is equal to luminous flux of original optical polarization structures.

2. A repairing method for abnormal pixel spots of a display panel, comprising:

installing a polarizing plate on a display panel;

finding and marking abnormal pixel spots on the polarizing plate; and irradiating the abnormal pixel spots by using specific light rays to form a shading portion to reduce a luminous flux, wherein a step of finding and marking the abnormal pixel spots on the polarizing plate comprises:

finding and marking abnormal pixel bright spots on the polarizing plate;

finding and marking first reference abnormal pixel bright spots on the first substrate;

finding and marking second reference abnormal pixel bright spots on a filter position;

verifying whether the abnormal pixel bright spots are correct through the first reference abnormal pixel bright spots and the, second reference abnormal pixel bright spots; and entering a next step if correct, otherwise, finding and marking abnormal pixel bright spots again;

the polarizing plate successively comprises a first film layer, a polarizing layer, a second film layer and a pressure sensitive adhesive layer from outside to inside;

a step of irradiating the abnormal pixel spots by using specific light rays to form a shading portion to reduce a luminous flux comprises: processing the polarizing layer by using the specific light rays and changing optical polarization structures at the abnormal pixel spots corresponding to the polarizing plate to form the shading portion, wherein luminous flux of repaired optical polarization structures at the abnormal pixel bright spots is equal to luminous flux of original optical polarization structures.

3. The repairing method for the abnormal pixel spots of the display panel of claim 2, wherein the polarizing plate successively comprises a first film layer, a polarizing layer, a second film layer and a pressure sensitive adhesive layer from outside to inside: and a step of irradiating the abnormal pixel spots by using specific light rays to form a shading portion to reduce a luminous flux comprising: processing the polarizing layer by using the specific light rays and changing optical polarization structures at the abnormal pixel spots corresponding to the polarizing plate to form the shading portion.

4. The repairing method for the abnormal pixel spots of the display panel of claim 3, wherein the polarizing plate comprises a first polarizing plate disposed on a light-emitting surface of the display panel and a second polarizing plate disposed on a light-entry surface of the display panel; and a step of processing the polarizing layer by using the specific light rays and changing optical polarization structures at the abnormal pixel spots to form the shading portion comprising: processing the polarizing layer of the first polarizing plate by using the specific light rays and changing the optical polarization structures at the abnormal pixel spots to, form the shading portion.

5. The repairing method for the abnormal pixel spots of the display panel of claim 2, wherein a step of finding and marking the abnoniial pixel spots on the polarizing plate comprises:
   finding and marking abnoniial pixel bright spots; and
   a step of changing optical polarization structures at the abnormal pixel spots by using the specific light rays comprises:
   changing optical polarization structures at the abnormal pixel spots by using the specific light rays to form a shading portion.

6. The repairing method for the abnormal pixel spots of the display panel of claim 2, wherein the specific light rays comprise low-wavelength infrared rays.

7. The repairing method for the abnormal pixel spots of the display panel of claim 2, wherein the specific light rays comprise picosecond laser.

8. The repairing method for the abnormal pixel spots of the display panel of claim 2, wherein the specific light rays comprise ultraviolet light.

9. The repairing method for the abnormal pixel spots of the display panel of claim 2, wherein the specific light rays comprise low-wavelength infrared rays or picosecond laser.

10. The repairing method for the abnormal pixel spots of the display panel of claim 2, wherein the specific light rays comprise low-wavelength infrared rays or ultraviolet light.

11. The repairing method for the abnormal pixel spots of the display panel of claim 2, wherein the specific light rays comprise picosecond laser or ultraviolet light.

12. The repairing method for the abnormal pixel spots of the display panel of claim 2, wherein the specific light rays comprise low-wavelength infrared rays and picosecond laser or ultraviolet light.

13. The repairing method for the abnormal pixel spots of the display panel of claim 2, wherein the display panel comprises a first substrate and a second substrate, an active switch is installed on the first substrate, and a step of finding and marking the abnormal pixel spots on the polarizing plate comprises:
   finding and marking first reference abnormal pixel bright spots on the first substrate; and
   finding and marking abnormal pixel bright spots corresponding to the polarizing plate through a reference abnormal pixel bright spots.

14. The repairing method for the abnormal pixel spots of the display panel of claim 13, wherein a step of finding and marking the abnormal pixel spots on the polarizing plate further comprises:
   finding and marking second reference abnormal pixel bright spots on a filter position; and
   finding and marking abnormal pixel bright spots corresponding to the polarizing plate through the first reference abnormal pixel bright spots and the second reference abnormal pixel bright spots.

* * * * *